(12) United States Patent
Commaret et al.

(10) Patent No.: US 7,971,439 B2
(45) Date of Patent: Jul. 5, 2011

(54) ANNULAR TURBOMACHINE COMBUSTION CHAMBER

(75) Inventors: Patrice Andre Commaret, Rubelles (FR); Didier Hippolyte Hernandez, Quiers (FR); David Locatelli, Gex (FR)

(73) Assignee: SNECMA, Paris (FR)

( * ) Notice: Subject to any disclaimer, the term of this patent is extended or adjusted under 35 U.S.C. 154(b) by 886 days.

(21) Appl. No.: 11/859,280

(22) Filed: Sep. 21, 2007

(65) Prior Publication Data

US 2008/0072603 A1     Mar. 27, 2008

(30) Foreign Application Priority Data

Sep. 22, 2006   (FR) .................................... 06 53896

(51) Int. Cl.
*F23R 3/50*       (2006.01)
(52) U.S. Cl. .................. 60/798; 60/804; 60/752
(58) Field of Classification Search .................... 60/800, 60/804, 752, 798
See application file for complete search history.

(56) References Cited

U.S. PATENT DOCUMENTS

| | | | | |
|---|---|---|---|---|
| 3,854,285 | A | * | 12/1974 | Stenger et al. .................. 60/756 |
| 5,353,599 | A | * | 10/1994 | Johnson et al. ................. 60/748 |
| 6,164,074 | A | * | 12/2000 | Madden et al. ................. 60/752 |
| 6,655,148 | B2 | * | 12/2003 | Calvez et al. ................... 60/800 |
| 6,775,985 | B2 | * | 8/2004 | Mitchell et al. ................. 60/800 |
| 2002/0184893 | A1 | * | 12/2002 | Farmer et al. ................... 60/804 |
| 2006/0010879 | A1 | | 1/2006 | Aumont et al. |

FOREIGN PATENT DOCUMENTS

| | | |
|---|---|---|
| EP | 1 265 032 A1 | 12/2002 |
| EP | 1 265 033 A1 | 12/2002 |
| EP | 1 340 941 A2 | 9/2003 |

OTHER PUBLICATIONS

U.S. Appl. No. 12/190,105, filed Aug. 12, 2008, Commaret, et al.
U.S. Appl. No. 11/837,856, filed Aug. 13, 2007, Commaret, et al.

* cited by examiner

*Primary Examiner* — Ted Kim
(74) *Attorney, Agent, or Firm* — Oblon, Spivak, McClelland, Maier & Neustadt, L.L.P.

(57) ABSTRACT

An annular turbomachine combustion chamber comprising an inner wall, an outer wall, and a chamber end wall disposed between said inner and outer walls in the upstream region of said chamber, the chamber end wall presenting a central portion and an outer assembly flange, and the outer wall presenting an upstream assembly flange, the chamber end wall and the outer wall being assembled together by their assembly flanges, in which the free edge of said outer assembly flange is curved inwards. In addition, the outer face of the outer assembly flange presents a shoulder.

11 Claims, 2 Drawing Sheets

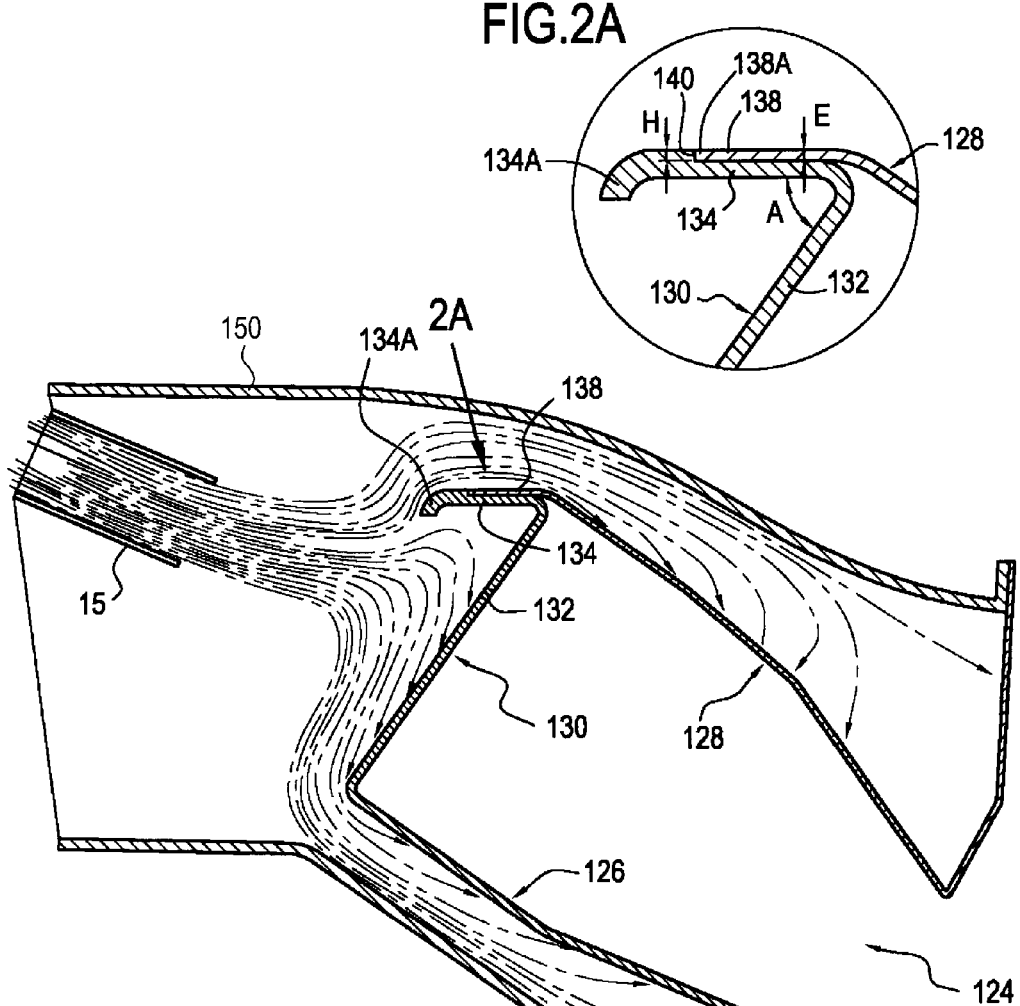

ANNULAR TURBOMACHINE COMBUSTION CHAMBER

The invention relates to an annular turbomachine combustion chamber. It is intended for any type of turbomachine: a turbojet, a turboprop, a terrestrial gas turbine, etc.

FIELD OF THE INVENTION

FIG. 1 is a diagrammatic axial half-section view showing a portion of a turbojet fitted with a centrifugal compressor/diffuser and a direct combustion chamber 24 of known type.

The combustion chamber 24 presents generally circular symmetry about the axis of rotation 10 of the turbomachine rotor. The chamber 24 comprises an inner wall 26, an outer wall 28, and a chamber end wall 30 disposed between said inner and outer walls in the upstream region of said chamber, the end wall presenting a central portion 32 and an outer assembly flange 34, and the outer wall 28 presenting an upstream assembly flange 38, the chamber end wall and the outer wall being assembled together by their assembly flanges 34, 38. The assembly flanges 34, 38 are generally conical or cylindrical in shape and they overlap.

BACKGROUND OF THE INVENTION

In turbojets having a centrifugal compressor/diffuser, the diffusion stream of compressed air coming from the diffuser (more precisely from the flow-straightening outlet 15 of the diffuser) shown in fine lines in FIG. 1 is directed more or less perpendicularly to the central portion 32 of the chamber end wall. This orientation depends, amongst other things, on the general inclination of the combustion chamber 24 relative to the axis of rotation 10 of the turbomachine. The chamber 24 can be inclined to a greater or lesser extent so as to reduce its axial size (i.e. length along the axis 10).

With such a diffusion stream, the assembly flanges 34 and 38 form an obstacle to the flow of compressed air, thereby creating turbulence downstream from said flanges. In order to limit such turbulence, it is known to fit an annular fairing piece 33 on the outside face of the flange 38. The free edge 33A, or upstream edge, of said piece 33 is curved towards the central portion 32 of the chamber end wall 30 so as to form a slope encouraging streamlined flow around said flanges 34, 38 and limiting head losses as much as possible.

The structure of the FIG. 1 combustion chamber is nevertheless complex. Furthermore, the annular fairing piece together with the outer wall 28 forms a downward step 35 (see FIG. 1A) that creates turbulence in the flow of air past said step.

OBJECT AND SUMMARY OF THE INVENTION

The invention seeks to provide a combustion chamber of simplified structure, having aerodynamic properties that are comparable or better than those of the chamber of FIG. 1.

The invention provides an annular turbomachine combustion chamber comprising an inner wall, an outer wall, and a chamber end wall disposed between said inner and outer walls in the upstream region of said chamber, the chamber end wall presenting a central portion and an outer assembly flange, and the outer wall presenting an upstream assembly flange, the chamber end wall and the outer wall being assembled together by their assembly flanges, wherein the free edge of said outer assembly flange is curved inwards as to form a slope encouraging streamlined flow around the assembly flanges.

The combustion chamber of the invention thus no longer has a fairing piece, so its structure is simplified. The combustion chamber is therefore simpler to assemble.

In the present application, the terms "upstream" and "downstream" are defined relative to the normal flow direction of air through the turbomachine, while the terms "inner" (and "inwards") and "outer" (and "outwards") as applied to a turbomachine part are defined relative to the axis of rotation of the turbomachine, the inner and outer portions of the assembly or of a part being respectively their portions closest to and furthest from said axis.

Advantageously, the outer wall is releasably assembled to the chamber end wall (which means that it is not possible to braze or weld the outer wall to the chamber end wall). For example, the outer wall and the chamber end wall are assembled together by bolts. In this way, it is possible to remove the outer wall of the combustion chamber in order to access the inside of the chamber while performing repair or maintenance operations.

In an embodiment of the invention, the outer face of the outer assembly flange of the chamber end wall presents a shoulder. In the outer face of the outer assembly flange, said shoulder constitutes a step that goes downwards from upstream to downstream.

Advantageously, in this embodiment, while assembling the chamber end wall and the outer wall, the free edge of the upstream assembly flange of the outer wall is brought into abutment against said shoulder, thus enabling said assembly flanges to be positioned easily and correctly relative to each other prior to being assembled together.

Advantageously, in this first embodiment, the height of said shoulder is greater than the thickness of the upstream assembly flange. This enables a downward step to be formed between the outer face of the outer assembly flange and the outer face of the upstream assembly flange. A downward step in the outer face leads to less disturbance in the diffusion stream than does an upward step.

Also advantageously, in order to minimize disturbance, it is preferred to form no step between the assembly flanges, so that the height of said shoulder is then substantially equal to the thickness of the upstream assembly flange.

For angles of more than 60° between the outer assembly flange and the central portion of the chamber end wall, the chamber end wall is made in conventional manner by stamping. Where necessary, said shoulder is made during a subsequent machining step. In contrast, for angles less than (or equal to) 60°, the chamber end wall is advantageously made by machining a forging.

BRIEF DESCRIPTION OF THE DRAWINGS

The invention and its advantages can be better understood on reading the following detailed description. The description refers to the accompanying figures, in which:

FIG. 1A is a view showing a detail of FIG. 1, as identified by arrow 1A;

FIG. 2 is a diagrammatic axial half-section view showing the same portion of an airplane turbojet as shown in FIG. 1, but fitted with an example of a combustion chamber of the invention; and FIG. 2A is a view showing a detail of FIG. 2, as identified by arrow 2A.

MORE DETAILED DESCRIPTION

Figure 1:
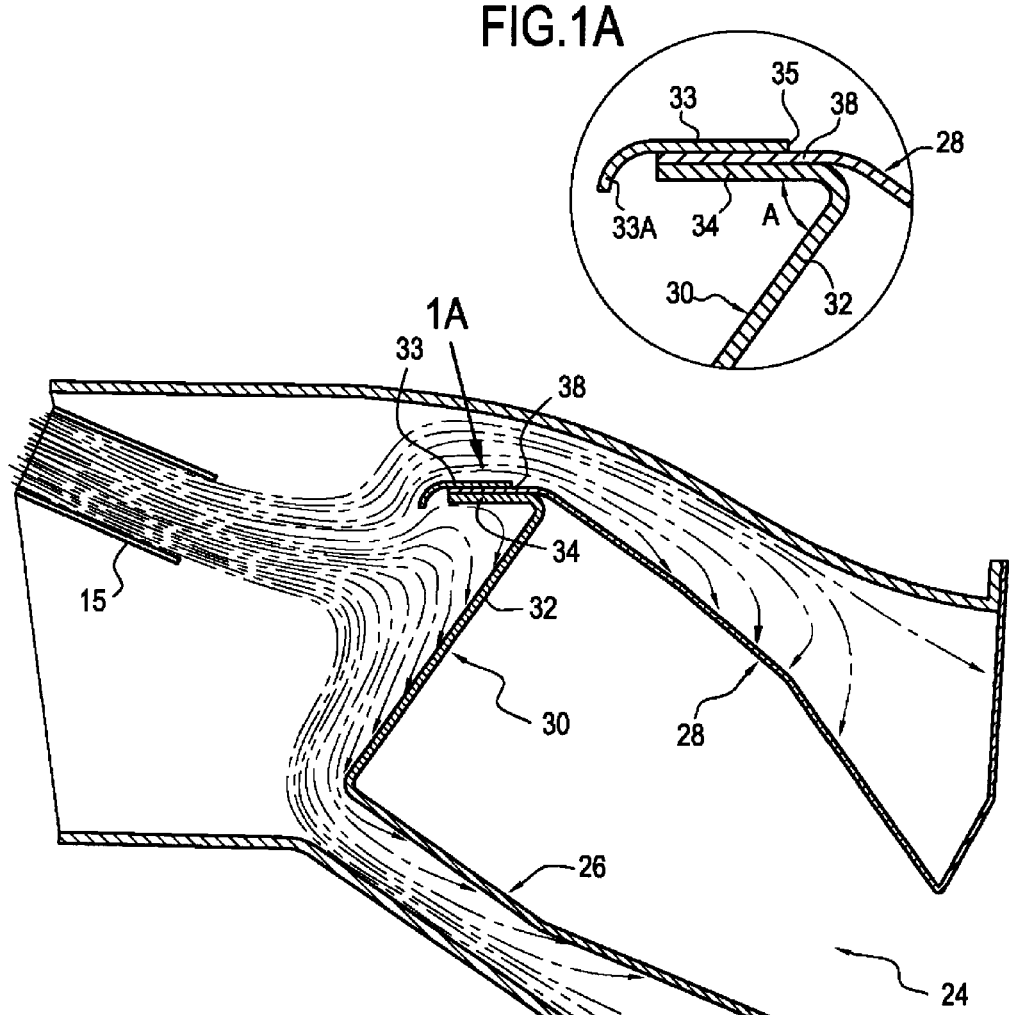
FIG. 1 is a diagrammatic axial half-section showing a portion of an airplane turbojet fitted with a prior art combustion chamber.

The combustion chamber 124 of FIG. 2 presents portions analogous to those of FIG. 1. These portions are identified by the same numerical references plus 100.

The combustion chamber 124 is said to be annular in the sense that it presents generally circular symmetry about the axis of rotation 10 of the turbomachine. The combustion chamber 124 comprises an inner wall 126, an outer wall 128, and a chamber end wall 130 disposed between said inner and outer walls in the upstream region of said chamber, the chamber end wall presenting a central portion 132 and an outer assembly flange 134, and the outer wall 128 presents an upstream assembly flange 138, the chamber end wall and the outer wall being assembled together via their assembly flanges 134, 138. The inner wall 126, the outer wall 128, and the chamber end wall 130 are generally circularly symmetrical about the axis 10.

The assembly flanges 134, 138 are generally conical or cylindrical in shape (centered on the axis 10) and they overlap at least in part (specifically in part in the example of FIG. 2).

It is recalled that the terms "inner" (and "inwards) and "outer" (and "outwards") are defined relative to said axis 10, in a radial direction (i.e. perpendicular to said axis 10) such that the (radially) inner portion of a part is closer to the axis 10 than is the (radially) outer portion of the same part.

The inner wall 126 is welded to the chamber end wall 130.

The outer wall 138 is assembled to the chamber end wall by bolts. More precisely, circumferentially-distributed bolts (not shown) are passed through holes formed in the assembly flanges 134, 138 of the chamber end wall and of the outer wall. During assembly, these assembly holes are caused to coincide, and the shanks of the bolts are passed therethrough prior to tightening the bolts around the flanges.

The outer wall 128 is thus easily separated by removing the bolts from the assembly flanges 134, 138.

In accordance with the invention, the free edge 134A, or upstream edge, of the outer assembly flange 134 of the chamber end wall 130 is curved inwards, i.e. towards the axis of rotation 10 (and not towards the outer casing 150 that surrounds the combustion chamber 124). In other words, the free edge 134A of the flange 134 is curved towards the central portion 132 of the chamber end wall that is situated inwards relative to the flange 134. In addition, the outer face of the flange 134 presents a shoulder 140 of height H. Thus, the zone of the outer face of the flange 134 that is situated downstream from the shoulder 140 is set back from the zone situated upstream from said shoulder.

The free edge 138A, or upstream edge of the upstream assembly flange 138 comes into abutment against the shoulder 140. The height H of the shoulder 140 corresponds substantially to the thickness E of the flange 138 of the outer wall 128, so as to avoid creating (on the outside) any difference in level between the flanges 134 and 138 (where such a difference would disturb air flow).

Finally, it should be observed that when the outer wall and the chamber end wall are assembled together, the shoulder 140 serves to position the flanges 134 and 138 relative to each other in the axial direction, thus making it easier subsequently to bring the bolt holes in the flanges into coincidence.

What is claimed is:

1. An annular turbomachine combustion chamber comprising:
    an inner wall;
    an outer wall; and
    a chamber end wall disposed between said inner and outer walls in the upstream region of said chamber, the chamber end wall presenting a central portion and an outer assembly flange, and the outer wall presenting an upstream assembly flange, the chamber end wall and the outer wall being releasably assembled together by their assembly flanges,
    wherein the free edge of said outer assembly flange is curved inwards,
    wherein the outer face of the outer assembly flange of the chamber end wall defines a shoulder, the shoulder including a radial face and an axial face, and
    wherein the free edge of the upstream assembly flange is in abutment against the radial face and the axial face of the shoulder.

2. A combustion chamber according to claim 1, in which the height of said shoulder is greater than or substantially equal to the thickness of said upstream assembly flange.

3. A combustion chamber according to claim 1, in which the height of said shoulder is equal to the thickness of said upstream assembly flange.

4. A combustion chamber according to claim 1, in which said outer assembly flange co-operates with the central portion of the chamber end wall to form an angle that is less than or equal to 60°.

5. A combustion chamber according to claim 1, in which the chamber end wall is made by machining a forging.

6. A combustion chamber according to claim 1, in which the outer assembly flange and the upstream assembly flange are generally conical or cylindrical in shape, and overlap, at least in part.

7. A turbomachine including a combustion chamber according to claim 1.

8. A combustion chamber according to claim 1, wherein the outer wall is assembled to the chamber end wall by bolts.

9. A combustion chamber according to claim 8, wherein the bolts pass through assembly holes formed in the upstream assembly flange and the outer assembly flange, these assembly holes coinciding when the free edge of the upstream assembly flange is in abutment against the shoulder.

10. A combustion chamber according to claim 1, wherein the shoulder forms a step that goes downwards from upstream to downstream.

11. A combustion chamber according to claim 1, wherein the free edge of the upstream assembly flange includes an axial end face which abuts the axial face of the shoulder and an inner radial face which abuts the radial face of the shoulder.

* * * * *